Patented May 15, 1945

2,376,049

UNITED STATES PATENT OFFICE 2,376,049

GRASS COMPOSITION FOR PRODUCING A POTABLE BREW

William R. Graham, Jr., Kansas City, Kans., and Elroy E. Frye, Kansas City, Mo., assignors to American Dairies, Incorporated, Kansas City, Mo., a corporation of Maryland, and The Quaker Oats Company, Chicago, Ill., a corporation of New Jersey, jointly No Drawing. Application May 10, 1943, Serial No. 486,426

5 Claims. (Cl. 99—28)

Our invention relates to a product from which a beverage is brewed and to a method of making the product.

An important object of our invention is to provide a beverage product that can be made from the leafy portion of any grass.

Another object of our invention is to provide a product of the above mentioned character from which a light colored, palatable brew can be made.

Still another object of our invention is to provide a product of the above mentioned character that has a distinctive aroma and taste.

Other objects and advantages of our invention will be apparent during the course of the following description.

We have discovered that if the green leafy portion of any grass is treated with an acid it turns gray-green in color and, when steeped in water, produces a brew having a slight yellow-green cast and a distinctive and palatable taste. When the grass has been thoroughly contacted with the acid and its color has changed from a bright green to a gray-green, the acid is neutralized and the grass dried. A brew made from the grass immediately after acid treatment and drying appears to have a taste somewhat less palatable than it acquires after storage for a week or ten days.

The acid-alkali treatment of the grass increases its weight to the extent that its immersion properties are markedly enhanced. The selection of the acid and neutralizing agent depends upon the salt or salts formed by the interaction of the acids and neutralizing agents used. The salts so formed should possess the following properties:

They should be nontoxic, should have a substantially neutral taste and it is preferred that a salt be formed that will increase the wetting properties of the mixture in order to facilitate extraction of the flavors, aroma and color in the brew.

In some locations the character of the water available for making the brew may determine the quantity, type or mixture of acids and neutralizing agents best adapted to the treatment of the grass.

Acids or mixtures of acids and neutralizing agents or mixtures thereof that will produce salts having the above characteristics should be used. Suitable acids for this purpose are phosphoric acid, lactic acid and acetic acid. Suitable neutralizing agents are sodium bicarbonate, sodium carbonate, sodium hydroxide, and calcium hydroxide. However, phosphoric acid and sodium bicarbonate or mixtures of phosphoric and lactic acid and sodium bicarbonate are preferred.

To prepare a product embodying the invention, a batch of grass is loaded into a vessel having a mechanical mixing device.

During the agitation of the grass, acid is added, preferably by means of a spray in order to intimately contact the grass with the acid. If dried grass is used, small amounts of moisture may be advantageously used which renders the grass more susceptible to the acid, probably due to better distribution of the acid in the grass. However, if fresh grass is used it is not necessary to dampen it with water before the acid treatment. Sufficient acid is used to produce a pH value of approximately 3.0 in the mixture. At this point the color of the grass changes from green to gray-green. The amount of acid employed is limited only by the deleterious effect it may have upon the characteristics of the product and upon the flavor and taste of the brew. The reaction on contact with acid is almost instantaneous at room temperature. An acid contact of one minute is sufficient for the changes required to produce a material that will yield a light colored brew. If a darker colored brew is desired, either the time of contact is increased or the temperature is raised. This darkens the grass and also may caramelize natural sugars in the grass to produce a product which will give a heavier bodied liquid when steeped in water. Heating at 212° F. for 5 minutes will give a brown or darker brew. If a still darker colored brew is desired a higher temperature or longer heating period is necessary. Heating at 212° F. for 10 minutes gives a product which will produce a dark, heavy bodied brew when steeped in water.

In each of the above operations, the time period of contact is a function of the temperature and the pH of the mixture, all must be controlled if a final product having the desired color and taste is obtained.

After the acid treatment, the batch of grass is neutralized. That is, the mixture is brought back to a pH of 6.0–6.5. It is then dried in any suitable manner.

If the procedure outlined above is followed a finished product is obtained which has the desired color and which will produce a brew having a distinctive and palatable flavor.

As a typical example of an operation by which a light colored product may be made, one pound of dried young oat grass was sized to about half inch lengths. The grass was then conveyed to a mixer where it was dampened with water. The dampened grass had a pH of 5.6-6.2. 100 milliliters of 85 per cent phosphoric acid was then sprayed into the mixer and the acid treated grass was tumbled for 5 minutes at room temperature. The tumbling thoroughly mixed the acid and grass and a chemical reaction took place which caused the grass to become grayish-green or olive-drab. This amount of acid reduced the pH of the grass mixture to 2.8. After the tumbling operation 175 grams of sodium bicarbonate was added to the grass to bring the pH of the mixture to 6.2. The material was then conveyed to a tray drier in which it was thoroughly dried at a temperature of 200° F. A week or ten days storage seems to improve the aroma and taste of the product and render the brew made therefrom somewhat more palatable.

As a typical example of an operation by which a darker brown colored product may be made, dehydrated green young oat grass was treated in the manner described in the first example, except that the mixing operation with the acid was conducted at a temperature of 212° F. for approximately 5 minutes. This high temperature darkened the product which, when steeped in water, produced a darker, heavier bodied brew.

In making a still darker or black product which produces a relatively darker brew, the same procedure or processing steps are employed as in the preceding examples, except that the grass-acid mixture was tumbled at a temperature of 212° F. for approximately ten minutes. This temperature and period of mixing gave a black colored product, which, when infused in water, produced a darker brew.

As an optional step to be performed in making the black product or that described in the third example, 5 grams of sugar is dissolved in the water used to dampen the grass. When this step is used, the period of heat treating the grass-acid mixture may be reduced.

The character and merit of all of the above products depends primarily upon complete dispersion of both the acid and neutralizing agent throughout the grass. This is particularly important in the production of the light colored product, such as that described in the first example. Where thorough mixing of the acid and neutralizing agent is accomplished, the acidification and neutralization is then uniform throughout the batch. If uniformity is not attained, a product producing an off-colored brew may result. This off-colored or darkened brew probably results from those portions of the batch which have not been properly neutralized and retain an acid condition during the drying step or subsequent storage periods. Uniformity is critical and sometimes difficult to attain where large batches of grass are being treated. Unless this uniformity is attained, what appears to be a satisfactory product may develop into a material producing an off-colored brew after a period of storage.

Having thus described our invention, we claim:

1. A method of producing a dry product from the leafy portion of cereal grass from which is brewed a potable beverage, comprising the steps of intimately contacting the grass with an edible acid, neutralizing the acid in situ and drying the grass impregnated with a resultant edible salt.

2. A method of producing a dry product from the leafy portion of cereal grass from which is brewed a potable beverage, comprising the steps of intimately contacting the grass with phosphoric acid, neutralizing the acid with sodium bicarbonate in situ and drying the grass impregnated with the resultant edible salt.

3. A method of producing a dry product from the leafy portion of cereal grass from which is brewed a potable beverage, comprising the steps of intimately contacting the grass with lactic acid, neutralizing the acid with sodium bicarbonate in situ and drying the grass impregnated with the resultant edible salt.

4. A method of producing a dry product from the leafy portion of cereal grass from which is brewed a potable beverage, comprisng the steps of intimately contacting the grass with a mixture of phosphoric acid and lactic acid, neutralizing the acid mixture with sodium bicarbonate in situ and drying the grass impregnated with a resultant edible salt as the product.

5. A method of producing a dry product from the leafy portion of cereal grass from which is brewed a potable beverage, comprising the steps of intimately contacting the grass with an acid, heating the acid treated grass to darken its color, neutralizing the acid in situ and drying the grass impregnated with the resultant edible salt.

WILLIAM R. GRAHAM, JR.
ELROY E. FRYE.